United States Patent Office 3,366,642
Patented Jan. 30, 1968

3,366,642
TRICYCLODECENEDIIMIDES AND PROCESS FOR THEIR PRODUCTION
Jerald S. Bradshaw, Richmond, Calif., assignor to Chevron Research Company, San Francisco, Calif., a corporation of Delaware
No Drawing. Filed Oct. 12, 1965, Ser. No. 495,305
8 Claims. (Cl. 260—326)

ABSTRACT OF THE DISCLOSURE

This invention relates to novel alkyl substituted tricyclodecenediimide compounds and to a process for their production by the radiant energy catalyzed reaction of a maleimide with an alkyl substituted benzene.

This invention relates to a novel di-imido tricyclodec-9-ene compound and certain derivatives thereof. More particularly, it relates to tricyclo [4.2.2.0$^{2,5}$] dec-9-ene-3,4,7,8-tetracarboxylic-diimide and to certain 9-hydrocarbyl derivatives thereof. Still more particularly, it relates to novel compounds of the formula

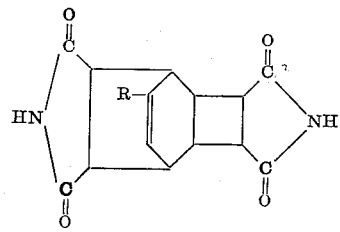

in which R is hydrogen or a saturated hydrocarbon radical having fewer than 21 carbon atoms and to a process for the production of the foregoing and analogous compounds.

In general the diimides of the present invention are useful per se and as co-monomers for the preparation of linear polymers. They also are useful as chemical modifiers as in the curing of epoxy-type polymers and the like. As little as 100 p.p.m. of the diimide in water when applied to soil containing certain preemergent plant seedlings kills most of them. Similar treatment of the growing emerged plants causes stunting and deformation. Linear methylene bridged polyimides as from the reaction of the subject diimides with a polymethylene diamine, such as hexamethylene diamine, are tough high melting polymers useful for the production of films and the like.

In accordance with the present invention the novel compounds of the invention are prepared by the reaction of two maleimide molecules with one molecule of benzene or of a lower hydrocarbyl substituted benzene. The reaction is promoted by the action of actinic light upon a mixture of maleimide and the desired benzene.

In a preferred embodiment of the instant process, a reaction mixture containing from about 10–20 mols of the desired benzene per mol of maleimide plus about 10–20 mols of acetone and about 1 mol of an arylketone photoinitiator, such as acetophenone, is irradiated at about 20° C. by a mercury arc lamp for a period up to about 65 hours. Most of the resulting diimide product crystallizes from the reaction mixture during the course of the reaction in the form of colorless substantially pure needles. After removal by distillation of the added acetone solvent a somewhat larger crop of crystals is collected from the cooled product mixture by filtration and washed with ether to remove minor amounts of adherent impurities such as acetophenone or reactants. For most purposes the washed product is suitable.

By actinic light is meant any radiant energy having an appreciable, i.e., at least 1%, amount of its energy in the wave length range from about 2000 to 4000 A. Sunlight is useful. Mercury arc lamps are a preferred source of the radiant energy required in the process.

The present process proceeds in the absence of certain photoinitiators. However, when they are present in the reaction system, quantum yields relative to the light energy applied are substantially improved, and thus their presence is preferred. In general, arylketones, for example such as acetophenone and benzophenone, are effective for this purpose. Of the arylketones acetophenone is preferred for reasons of practicality which include costs, availability and relative ease of removal from product mixture. Surprisingly, lower dialkyl ketones, i.e., same or different alkyl groups having fewer than 5 carbon atoms, are also useful photoinitiators. They are also advantageous in the process in that the desired diimide products are in general more soluble therein. Acetone is a particularly preferred dialkyl ketone photoinitiator for the process.

Maleimide reacts in general in the above described manner with benzene and certain mono-substituted benzene hydrocarbons. However, in some instances, i.e., in particular where the substituent contains a large number of carbon atoms, an improved solubility relationship as between the reactants is possible by the use of N-alkyl substituted maleimides, for example where an alkyl group having from 1 to 10 carbon atoms is substituted for the imide hydrogen atom. In yet another aspect of the process alkylene bridged polyimides are producible when an alkylene dimaleimide of the formula

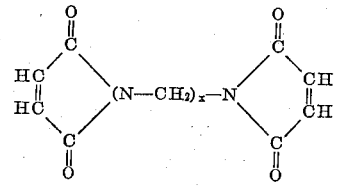

wherein $x$ is a number in the range 2–10, inclusive, is used rather than maleimide. The resulting linear polymers form films, etc.

Neither temperature nor pressure exerts a primary functional effect in the process. Thus the rate of the reaction is little affected by either so long as both are sufficiently elevated to maintain a liquid phase reaction system. A temperature in the range from about 0° C. to 150° C. and atmospheric pressure are generally satisfactory.

Benzene hydrocarbons useful in the process are of the formula

wherein R is hydrogen or a saturated hydrocarbyl radical having fewer than 21 carbon atoms. By hydrocarbyl radical is meant one composed only of carbon and hydrogen.

Representative benzene hydrocarbons useful in the process include such compounds as benzene, toluene, cumene, t-butylbenzene, hexahydrobenzilbenzene, s-butylbenzene, 3-phenyloctane, 5-phenylhexadecane, 2-methyl-5 - phenyl-8-cyclohexyltridecane, 1-phenyldodecane, 3-phenylpentadecane, 4-phenyldodecane, 2-phenylpentane, 1-phenylhexane, 1-phenylbutane, 6-phenylnonadecane, and the like compounds, that is, benzene substituted by a single saturated hydrocarbon radical having fewer than 21 carbon atoms including cyclic, acyclic and combinations thereof radicals. Preferred benzenes for use in the process are those in which R of the formula supra is an alkyl group having fewer than 21 carbon atoms.

The following examples are illustrative of the invention.

EXAMPLE 1

Into a Pyrex reaction vessel were charged maleimide, benzene, acetophenone, and acetone in the mol ratio of about 1:28:0.5:6, respectively. The charge was irradiated for 65 hours with a Hanovia lamp under ambient conditions of temperature and pressure. During this period the crystalline reaction product collected on the sides of the vessel in the form of needles. It was recovered by filtration and washed with ethyl ether. The yield based upon maleimide was 82 percent, and the product had the following characteristics:

Sublimation temperature, ° C., 290

*Analysis.*—Nitrogen, calculated: 10.31 percent. Nitrogen, found: 10.60 percent.

Infrared spectrum, KBr disc, cm.$^{-1}$, 3250, 1770, 1680, 1340, 1180, 1160, 995, 820

EXAMPLE 2

As in Example 1, a tricyclodecene diimide was prepared except that maleimide, ethylbenzene, acetophenone and acetone in the mol ratio 1:2.6:0.2:2.7 were charged. A 71 percent yield of crystalline product having a melting point in the range 200–220° C. and essentially the same characteristic infrared spectrum as the compound in Example 1, except that at about 1450 cm.$^{-1}$ the absorption was that characteristic for the alkyl group.

EXAMPLES 3–6

In a manner analogous to that of Example 1, except that the runs were carried out for only 18 hours' duration, the following alkylbenzenes were reacted with maleimide: t-butylbenzene, a linear $C_{10}$–$C_{13}$ alkylbenzene (average molecular weight 431), $C_{11}$–$C_{13}$ polypropylbenzene (77% $C_{12}$, 13% $C_{13}$ and 8% $C_{11}$), and toluene. The following data were obtained:

(1) *t-Butylbenzene adduct—*

| | |
|---|---|
| Melting point range, ° C. | 345–52 |
| Analysis, nitrogen, percent: | |
| Calculated | 8.53 |
| Found | 8.85 |
| Nuclear magnetic resonance | |
| Spectra (run in deuterated dimethyl sulfoxide): | |
| Vinyl protons (δ 6.0) | 1 |
| t-Butyl protons (δ 1.01) | 9 |
| Amide protons (δ 10.8) | 2 |
| Ring protons (δ 2.0–3.5) | 8 |
| Infrared spectra.[1] | |

[1] See figure.

(2) $C_{10-13}$ *alkylbenzene adduct (white needles)*

| | |
|---|---|
| Melting point, ° C. | 223–232 |
| Infrared spectra, cm.$^{-1}$, bands: | |
| 5 | 2900–3700 |
| 2 | 1700–1780 |
| 1 | 1340 |
| 1 | 1175 |
| 1 | 1000 |
| 1 | 820 |

(3) $C_{12}$ *polypropylbenzene adduct*

| | |
|---|---|
| Melting point, ° C. | 267–72 |

The infrared spectra for the imides of this invention are the same in all essential details and are illustrated by the above figure for the t-butylbenzene adduct. At about 1400–1550 cm.$^{-1}$ the spectra of these compounds, of course, differ. This difference reflects variations caused by the alkyl group differences. The fact that these products have but one vinyl proton (NMR) establishes the position of the alkyl substituents as attached to a vinyl carbon atom.

I claim:

1. Di-imido compound of the formula

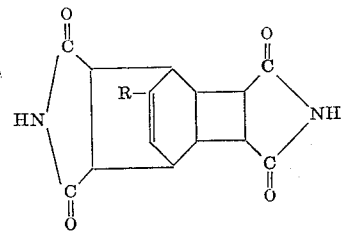

in which R is hydrogen or an alkyl radical having fewer than 21 carbon atoms and having characteristic infrared adsorption at

| Cm.$^{-1}$: | | |
|---|---|---|
| 3000–3500 | bands | 3 to 4 |
| 1680–1780 | do | 2 |
| 1340–1350 | do | 1 |
| 1160–1200 | do | 1 or 2 |
| Ca. 1000 | do | 1 |
| 800–900 | broad bands | 1 |

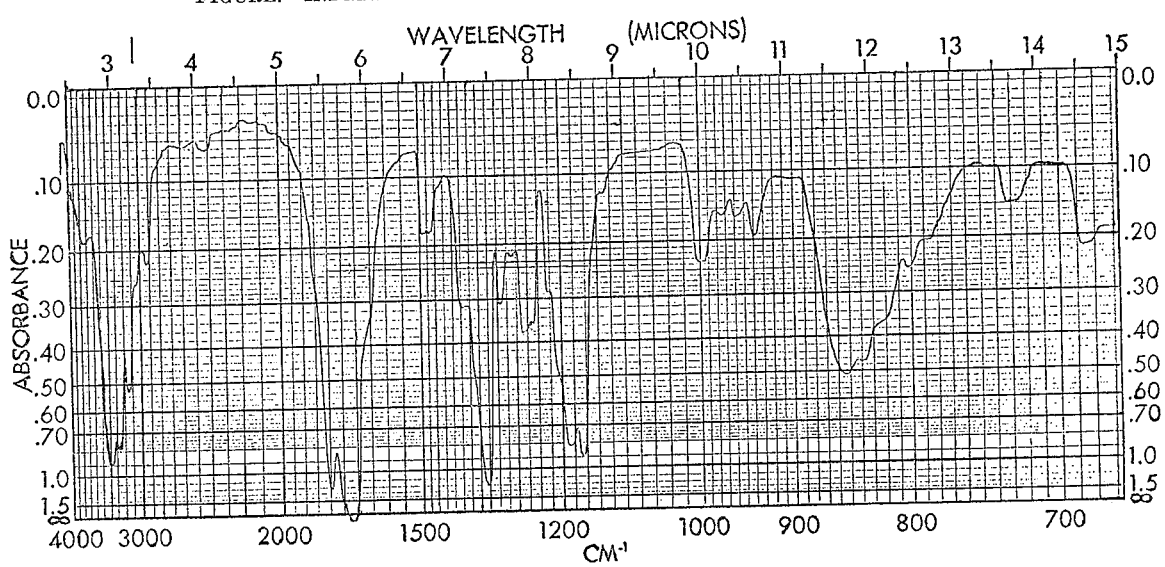

FIGURE.—INFRARED SPECTRUM OF t-BUTYLBENZENE-MALEIMIDE ADDUCT

2. Process for the production of a tricyclo-diimide of the formula

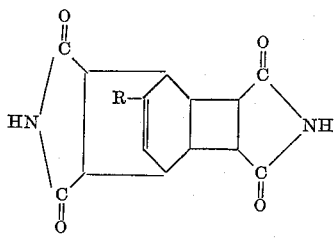

which comprises irradiating a mixture of maleimide and a benzene hydrocarbon of the formula

wherein R is an alkyl hydrocarbon radical having fewer than 21 carbon atoms wherein said irradiation is by actinic light with the mixture being at a temperature which is sufficiently elevated to maintain it in the liquid phase but below the pyrolysis temperature of maleimide, and wherein said mixture is maintained at a pressure sufficient to maintain said benzene in the liquid phase, thereby effecting the chemical addition of two molecules of maleimide to one molecule of said benzene.

3. Process of claim 2 wherein said irradiation is by mercury arc lamp.

4. Process of claim 2 wherein said irradiation is by sunlight.

5. Process of claim 2 carried out in the presence of a ketone photoinitiator solute.

6. Process of claim 2 carried out in the presence of acetone and acetophenone.

7. Process of claim 2 carried out in the presence of a lower dialkyl ketone.

8. Process for the production of a tricyclo-diimide of the formula

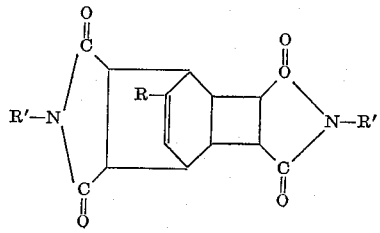

which comprises irradiating a mixture of a maleimide of the formula

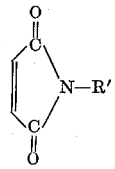

wherein R' is an alkyl group containing from 1 to 10 carbon atoms; and a benzene hydrocarbon of the formula

wherein R is an alkyl hydrocarbon radical having fewer than 21 carbon atoms wherein said irradiation is by actinic light with the mixture being at a temperature which is sufficiently elevated to maintain it in the liquid phase but below the pyrolysis temperature of maleimide, and wherein said mixture is maintained at a pressure sufficient to maintain said benzene in the liquid phase, thereby effecting the chemical addition of two molecules of said substituted maleimide to one molecule of said benzene.

References Cited

UNITED STATES PATENTS

| | | | |
|---|---|---|---|
| 2,795,589 | 6/1957 | Bluestone | 260—326 |
| 3,210,374 | 10/1965 | Huebner | 260—326 |

OTHER REFERENCES

Bryce-Smith et al.: Chem. Soc. Jour., February 1965, pp. 918–924.

Bryce-Smith et al.: Chem. & Ind., 1962, p. 2060.

Grovenstein et al.: Jour. Amer. Chem. Soc., vol. 83, 1961, pp. 1705–1711.

Hammond et al.: Proc. Chem. Soc., 1963, pp 63–64.

ALEX MAZEL, *Primary Examiner.*

J. A. NARCAVAGE, M. O'BRIEN, *Assistant Examiners.*

UNITED STATES PATENT OFFICE
CERTIFICATE OF CORRECTION

Patent No. 3,366,642  January 30, 1968

Jerald S. Bradshaw

It is hereby certified that error appears in the above numbered patent requiring correction and that the said Letters Patent should read as corrected below.

Column 5, lines 41 to 48, the formula should appear as shown below:

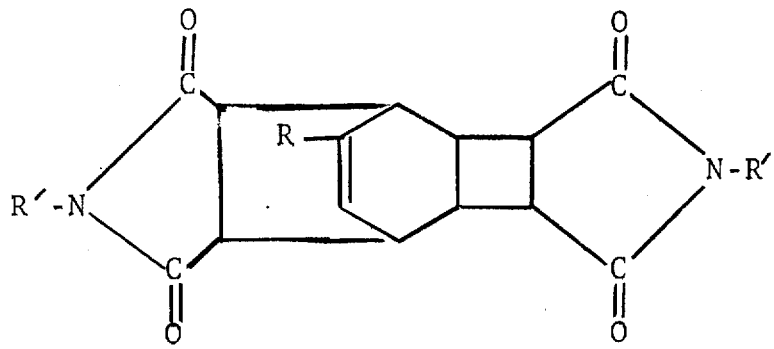

Signed and sealed this 23rd day of September 1969.

(SEAL)
Attest:

EDWARD M. FLETCHER, JR.
Attesting Officer

WILLIAM E. SCHUYLER, JR.
Commissioner of Patents